July 15, 1924.

E. F. ALLIN

HAIR CLIPPERS

Filed July 5, 1923

1,501,737

Edwin F. Allin INVENTOR.

Patented July 15, 1924.                                    1,501,737

UNITED STATES PATENT OFFICE.

EDWIN F. ALLIN, OF OKLAHOMA CITY, OKLAHOMA.

HAIR CLIPPERS.

Application filed July 5, 1923. Serial No. 649,477.

*To all whom it may concern:*

Be it known that I, EDWIN F. ALLIN, a citizen of the United States, residing at Oklahoma City, in the county of Oklahoma and State of Oklahoma, have invented a certain new and useful Improvement in Hair Clippers, of which the following is a specification, reference being had to the accompanying drawings.

My invention relates to improvements in hair clippers. The object of my invention is to construct a hair clipping machine which will be novel, of simple construction, cheap, easily assembled, of easy and cheap operation, and almost noiseless in its use.

In carrying out the intention of my invention, the invention, novel features, details of construction, combination of parts, and other objects of the invention will be hereinafter more particularly set forth, illustrated in the accompanying one-page drawing, and pointed out in the appended claim.

Referring to the drawing forming a part of this application,

Like characters of reference designate like parts in all the figures.

Figure 1:
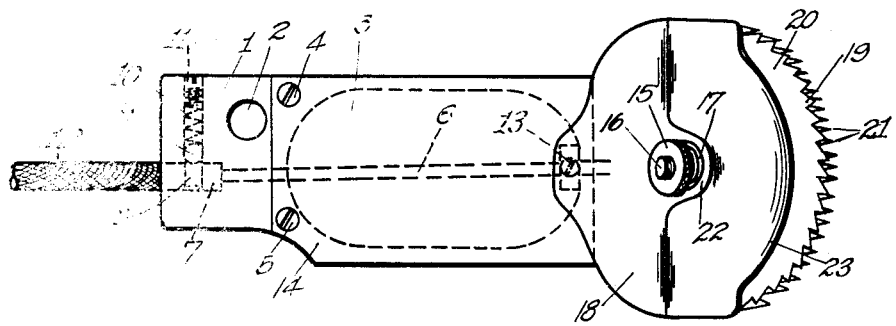
Figure 1 is a plan view showing the arrangement of the handle, opening in the handle, and the hair clippers.

As stated the invention relates to improvements in hair-clipping, and hair-cutting machines, and particularly those running by electrical current.

It includes the usual and ordinary parts of such machines, such as, connection with electric current, a handle 1 with a chamber therein 3, a covering for said chamber 14 with means 4, 5, 15, 16, 17 and 18 for securely fastening same, a hole 2 in the handle for hanging up when not in use. It also includes a drive-shaft 6, the lower end of which is provided with a shoulder 7. In this shoulder is a recessed or hollowed out portion 8 extending entirely around the circumference of the said shoulder, and into which recess fits at intervals a ball 9 held in place by a spring 10 and screw 11; near the upper end of said drive-shaft is a collar held in place by a screw 13, said shoulder and said collar permitting said drive-shaft to play or move endwise only a limited distance. At the lower end of said drive-shaft working and connected therewith is a flexible shaft 12. At the upper end of said drive-shaft is securely fastened to a bevel-gear 29 working in connection with a gear 28 on the back of the rotary cutting blade 20 having on its outer edge or periphery teeth 19, working revolubly by the action of said drive-shaft 6 and bevel-gear 29 and gear 28 against and with the teeth 21 on the outer and upper edge of the lower or stationary blade 24. Said stationary blade is held in place on said handle and device by screws 33 and 34 in holes 31 and 32 securely connecting said blade to said handle 1; said cutting blade 20 is securely held in place and in working position on said stationary blade 24 by a threaded bolt 16 inserted through holes 25 and 26 in said stationary and cutting blades, 24 and 20, by a screw 27 at the lower end, and by a top-plate 18, 22 and 23 and by a spring 17 and a thumb-screw nut 15. All of said connections and particularly the friction point 23 working on said cutting-blade 20 keep the teeth 19 of the cutting-blade 20 and the teeth 21 on the stationary-blade 24 in working position, and the bevel-gear 29 and circular gear 28 on the back of the cutting-blade 20 in proper position for use.

Figure 4:
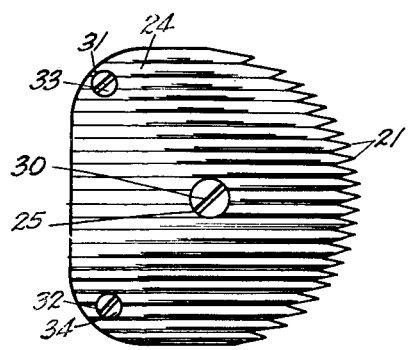
Figure 4 is a view of the stationary blade, or guard, showing the teeth and the manner of fastening the guard.

It will be seen from Figure 4, the preferred form of the point of the teeth 21 on the stationary blade 24 is in an upright position as compared with the line on the base of said stationary blade between the screws 33 and 34.

Figure 3:
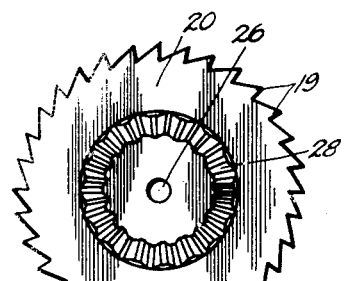
Figure 3 is a view of the rotary cutting blade showing the teeth and the circular gear which works in connection with a bevel gear.

It will also be seen from Figure 3 that the preferred form of the teeth 19 of the cutting-blade 20 is that the cutting surface of each of the teeth shall be on a direct straight line from the apex of each of said teeth to the center of the circular cutting-blade.

The preferred form of the top-plate 18 is on a line parallel with the top of the said handle 1 and rests immediately on top thereof from the point of its beginning to a point where near the threaded bolt 16 it is bent upwardly and there, for a short distance runs at an angle 22 and parallel with the cutting-blade 20, and is perforated by the threaded bolt 16, and thereafter is bent downwardly and in a reverse curve 35 terminating on the cutting-blade 20 at the friction point 23.

Figure 2:
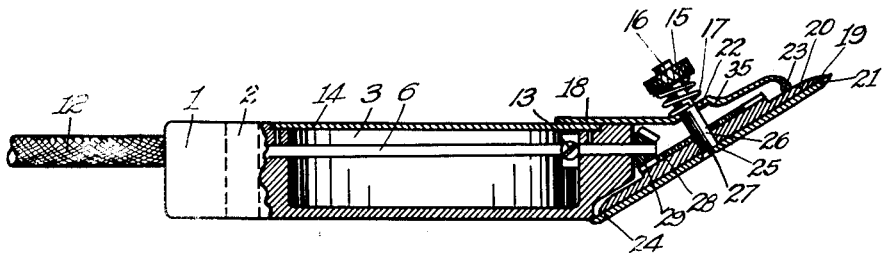
Figure 2 is a partial section view of the device.

As will be clearly seen in Figure 2 the stationary blade and the cutting blade are disposed at an angle of about forty-five degrees relative to the shaft 6, and this, together with the gear 28 being formed directly upon the cutting blade, makes a compact arrangement whereby the size of the device can be materially lessened and the strain is much less than when the gear is formed separate from the cutting blade and carried by a spindle or sleeve. The point 23 bearing directly on the cutting blade at a point opposite that where it engages with the bevel gear serves to keep the parts in alignment and insures better results.

As seen in Figure 2 the forward end of the member 1 has its lower portion in which the shaft 6 is journaled tapered as at 40, and this tapered wall is cut away at its lower end as at 41 to provide a space for the cutting blade 20 and to allow the stationary blade 24 to bear at its lower end against the member 1 as clearly seen in said figure to provide a firm bearing therefor. The friction point 23 of the top plate bears on the cutter blade 20 at the outer end thereof and serves to keep the gear 28 at all times in proper operative contact with the bevel gear 29.

In order to provide sufficiently sized bearings for the shaft 6, and yet obtain a handle that will not be too heavy, I form the handle with the relatively thick end portions, as seen in Figure 2, in which the ends of the shaft 6 are journaled and this gives me a receptacle in which the cutter blades may be stored. The removable cover plate 14 has a bearing in rabbets in the top face of the thickened ends of the chamber of the handle.

Having thus described the invention what is claimed and desired to be secured by Letters Patent, is:

A device of the character stated embodying a hollow handle with thickened end portions, a shaft extended lengthwise of and within said handle and having its ends journaled in said end portions, with one end extended, the under side of the end portion through which said shaft extends being inclined, a stationary blade disposed parallel with said inclined face with one end bearing against the bottom edge of said end, a cutter blade likewise inclined and bearing on said stationary blade, a gear on the extended end of said shaft, a gear rigid with the cutter blade and disposed upon the upper face thereof and meshing with the first-named gear, a cover plate over the chamber of the handle and resting on said end portions, a top plate having one side resting on said cover plate and its opposite side bearing frictionally on the outer edge of the cutter blade, and a bolt passed through said top plate, stationary and cutter blades, and an adjustable tension spring on said bolt.

Signed at Oklahoma City, Oklahoma County, Oklahoma, this 2" day of July, 1923.

EDWIN F. ALLIN.